J. R. PARKER.
Churn.
No. 24,233.
Patented May 31, 1859.
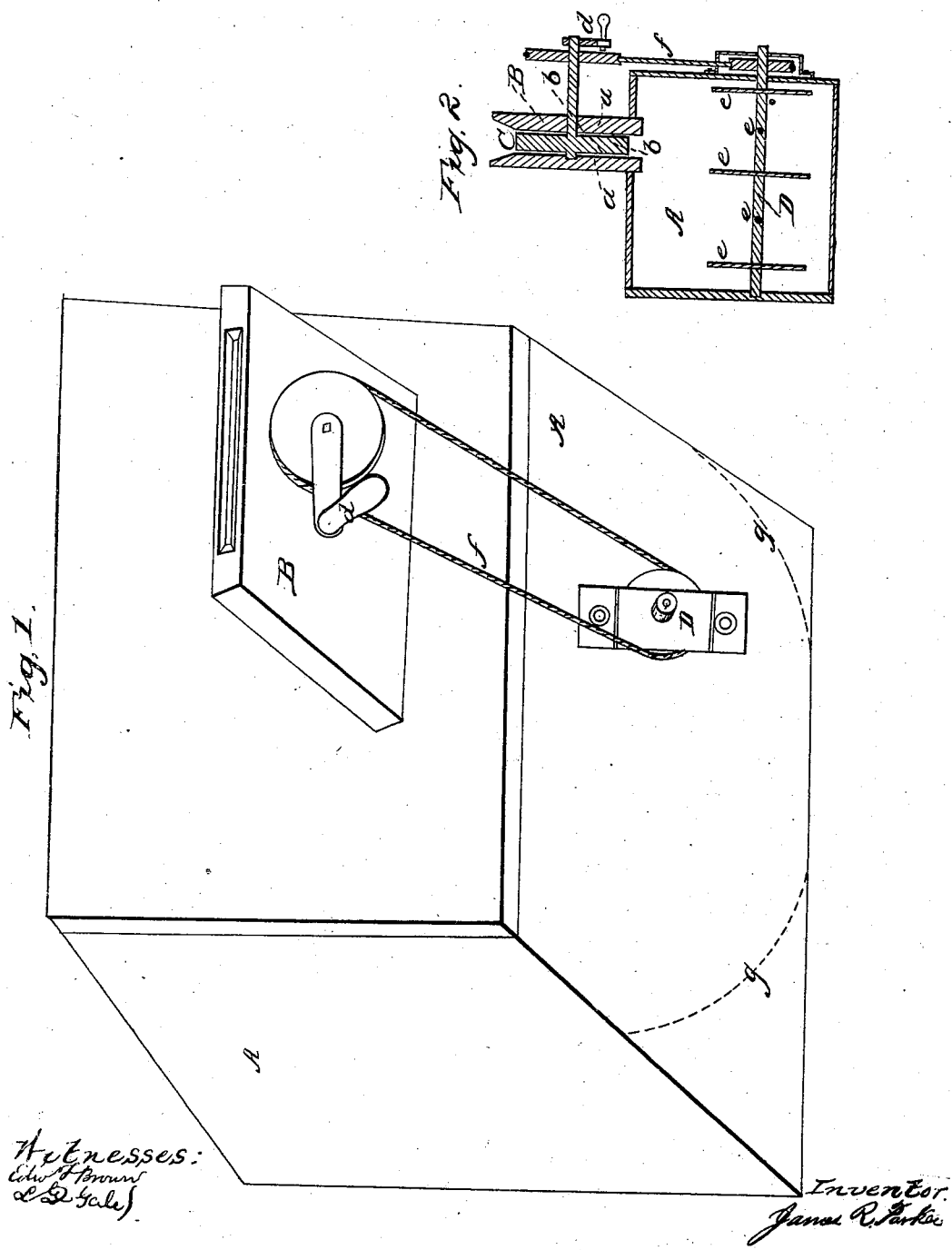

UNITED STATES PATENT OFFICE.

JAMES ROY PARKER, OF SING SING, NEW YORK.

CHURN.

Specification of Letters Patent No. 24,233, dated May 31, 1859.

*To all whom it may concern:*

Be it known that I, JAMES ROY PARKER, of the town of Sing Sing, in the county of Westchester and State of New York, have invented a new Mode or Apparatus for Making Butter; and I hereby declare that the following is a full and clear description of the same, reference being had to the annexed drawings, making a part of this specification, in which—

Figure 1 is a perspective view of the machine. Fig. 2 is a vertical cross section from front to rear in the line $x$, $x$, of Fig. 1.

Similar letters refer to the same parts in all the drawings.

The nature of the invention consists in a new mode or apparatus of making butter, founded on well substantiated facts that butter exists ready made in the sweet milk, but is contained in little vesicles floating in the milk, and that the ordinary mode of churning butter by powerful agitation of the milk or cream is a waste of power, and requires often much time and expense and is very unphilosophical, to say the least of it. All that is necessary to be done to answer the requirements is to pass the milk or cream between two or more frictional or rubbing surfaces, such as passing the liquid between two or any number of thin circular disks of wood, stone, metal, or composition, arranged vertically or inclined and put into motion, so that the liquid in passing through shall have its vesicles subjected to a frictional movement, that shall rupture the vesicles, and thus cause the oleaginous matter to be freely exposed to the air by which it is readily collected by any suitable gathering apparatus. Five minutes is, on an average, sufficient time to perform a churning of butter.

There are various ways by which the process of churning by frictional surfaces as substituted for the ordinary mode, may be performed. That which I have set forth herein below as my invention consists of a disk made to rotate with its flat surfaces between two cheeks or walls one on either side and through the spaces between said disk and walls the liquid is made to descend while the disk is in rapid motion and thereby subjected to a kind of grinding operation. These disks may be of wood, metal or other material.

A, A, represents a cubical box used as receptacle for the milk or cream, after passing through the grinding disk or disks.

B represents the elevated part of the apparatus containing the frictional apparatus.

C is the grinding disk having a small space between its sides and the box contiguous thereto.

$a$, $a$, represent the sides of the box, and $b$, $b$, the sides of disk that rotates.

$d$, is the crank by which the disk is rotated.

D is the gathering apparatus which sufficiently explains itself. The arms $e$, $e$, $e$, $e$, $e$ have the effect to stir the butter gently and gather it into masses.

$f$, is the cord by which the crank ($d$) operates both the disk C, and the gatherer D.

The cream or milk is poured slowly into the hopper at, C, and slowly runs down between its sides and the two sides of the wheel C and finally falls into the bottom of the cubical box. This bottom is made curved by filling up with wood or cement as shown by the dotted line $g$, $g$, in order that the arms $e$, $e$, $e$, $e$, $e$ of the gatherer D, may more effectually reach every portion of the butter and cause it to collect into masses.

It is proper to remark here that the faces of the disk or wheel C, should be very carefully made, so that the faces ($a$) should fit very accurately to faces ($b$) and so that the cream or milk may be fed slowly through the space between the disk and the sides of the hopper. For it will be perceived that the liquid, if the apparatus be properly arranged and operated, passes only once through the machine. Violent agitation is no part of the operation, as it is only necessary to pass the liquid through a passage so thin that the butter vesicles are broken in the passage by the frictional surfaces of the disk or disks. When the disks are of metal, they may be planed very accurately and afterward ground together. They may be one or many, with intervening stationary partitions and thus increase the frictional faces or surfaces to any extent that may be desired. On the other hand, the disks themselves may be very large and few in number, or they may be small and many in number. Instead of the disks being circular as set forth they may be rectangular and have a reciprocating or back-and-forth motion with each other, and that motion may be vertical or horizontal.

The liquid may be passed through a series of horizontal disks set eccentrically like the Bogardus paint mill, or centrically like the common flouring mill, and in all, perform the frictional work, which I have described and illustrated by the machine herein shown.

From what has been shown it is clear that the disks which are here described as set vertically, may be set obliquely or even horizontally and still perform their work in substantially the same manner.

What I claim as my invention is—

The combination of the rotating faces of the disk C, with the stationary faces B, B, in the manner and for the purposes set forth.

JAMES R. PARKER.

Witnesses:
EDW. F. BROWN,
S. D. GALE.